US006817748B2

(12) United States Patent
Campanelli et al.

(10) Patent No.: US 6,817,748 B2
(45) Date of Patent: Nov. 16, 2004

(54) METHOD FOR EVALUATING AND CONTROLLING A MIXING PROCESS

(75) Inventors: John Richard Campanelli, Akron, OH (US); Cigdem Gurer, North Canton, OH (US); Terry Lee Rose, Akron, OH (US); John Eugene Varner, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 154 days.

(21) Appl. No.: 10/288,179

(22) Filed: Nov. 5, 2002

(65) Prior Publication Data

US 2004/0085851 A1 May 6, 2004

(51) Int. Cl.[7] .................................................. B29B 7/72
(52) U.S. Cl. ..................................... 366/76.2; 366/76.7
(58) Field of Search ........................ 366/69, 76.1, 76.2, 366/76.7, 76.8; 425/204, 208, 209; 700/265, 266

(56) References Cited

U.S. PATENT DOCUMENTS

| | | | | | |
|---|---|---|---|---|---|
| 3,999,046 | A | * | 12/1976 | Porter .......................... | 702/44 |
| 4,076,220 | A | * | 2/1978 | Nakashima et al. .......... | 366/69 |
| 4,455,091 | A | | 6/1984 | Bamberger et al. | |
| 4,818,113 | A | * | 4/1989 | Patel .......................... | 366/76.2 |
| 4,830,506 | A | * | 5/1989 | Borzenski ................... | 366/76.2 |
| 5,324,107 | A | * | 6/1994 | Tanaka et al. .............. | 366/76.3 |
| 5,460,445 | A | * | 10/1995 | Miyoshi et al. ............. | 366/76.7 |
| 5,783,983 | A | * | 7/1998 | Ureshino et al. .......... | 366/76.7 |
| 5,865,535 | A | * | 2/1999 | Edwards ..................... | 366/76.7 |
| 2002/0159327 | A1 | * | 10/2002 | Proni et al. ................ | 366/76.7 |

FOREIGN PATENT DOCUMENTS

| | | | |
|---|---|---|---|
| DE | 2058975 | * | 6/1972 |
| DE | 4037028 A1 | * | 5/1992 |
| EP | 0172726 A2 | * | 2/1986 |
| EP | 0244121 A1 | * | 11/1987 |
| EP | 0845339 A1 | * | 6/1998 |
| EP | 1 201 387 A1 | | 5/2002 |
| GB | 2163061 A | * | 2/1986 |
| JP | 6-106525 | * | 4/1994 |
| JP | 7-285125 | * | 10/1995 |
| JP | 11-916 | * | 1/1999 |
| JP | 11-57445 | * | 3/1999 |
| JP | 11-77666 | * | 3/1999 |
| JP | 2000-814 | * | 1/2000 |
| WO | WO 99/24230 | | 5/1999 |

OTHER PUBLICATIONS

Reference for Equation (9) F. W. Billmeyer, Jr., *Textbook of Polymer Science*, 3rd ed., Wiley–Interscience, NY, 1984, pp. 322–323.
Reference for Equation (10) W. B. Russel, *J. Rheol*, 24 (3), 1980, p. 287–317.
Reference for Equation (11) R. Roscoe, *Br. Jr. Applied Physics*, 3, 1954, p. 267–269.
Reference for Equation (15) F. Bohin, D. L. Feke, I. Manas–Zloczower, *Rubber Chem Technol*, 69., 1996, p.1–7.
Reference for Equation (19) P. R. Couchman, *J. Appl. Polymer Sci.*, 83, 2002, p. 455–456.

* cited by examiner

*Primary Examiner*—Charles E. Cooley
(74) *Attorney, Agent, or Firm*—Richard B. O'Planick

(57) ABSTRACT

A method for evaluating and controlling a mixing process for polymer-based compounds includes the steps: obtaining initial starting conditions and values for viscosity dependent parameters; increasing batch temperature by a differential amount; calculating mixing parameters such as batch temperature, dispersion, viscosity, and torque based upon fundamental kinetic, thermodynamic, and theological models; determining whether an endpoint or end points of one or more mixing parameters has been achieved; and changing one or more conditions so as to achieve the desired endpoint(s).

18 Claims, 4 Drawing Sheets

METHOD FOR EVALUATING AND CONTROLLING A MIXING PROCESS

TECHNICAL FIELD

The invention relates generally to a method for mixing polymer based compounds and mixtures and more specifically, to a method for controlling such a process in the manufacture of tires or the like through the calculation and control of mixing parameters, and to a method of simulating such a process with algorithms run on a computer.

BACKGROUND OF THE INVENTION

It is well known to employ a mixer and mixing process in the formulation of compounds necessary to the manufacture of sundry goods including tires. The mixer may be either continuous or discontinuous. In a continuous process, material is passed through a cylindrical chamber by operation of a screw mechanism. A discontinuous, or "batch" process, mixes the material within an enclosed chamber by operation of one or more mixing rotors.

A typical mixer suitable for the discontinuous mixing of compounds consists of a mixing chamber containing a pair of rotors that rotate in opposite directions and thereby process discrete batches of material within the chamber. Commercial mixers are available and are marketed under the "Banbury" or "Intermix" names Component materials are combined in customized formulas within such mixers to create the various compounds necessary to the manufacture of tires. The component base materials and additive material, or "fillers", are combined to create particular "blends". Typically, a composition comprises a polymeric material to which one or more additive material is added to form a compound. The compound is then processed further or utilized directly in the manufacture of the finished product. In order to create a finished compound having the intended requisite performance characteristics, it is imperative that the composite materials are mixed homogeneously in a tightly controlled procedure. Control of the processing conditions in a mixer directly affects the quality of the mixture and mixture quality, in turn, affects the quality of the end product.

The mixing process must be controlled through the control of critical mixing parameters such as batch temperature, rotor speed and torque, and the extent of additive dispersion within the batch as a function of time. Controlling the process, as discussed above, is essential to minimize the possibility that compounds from one batch to another will prove non-uniform and result in an end product of uneven quality. A second consideration is that it is desirable to minimize the energy consumed throughout the mixing process to minimize costs.

Mixing kinetic, thermodynamic, and Theological principles, therefore, are of great interest to those engaged in the manufacture of products such as tires since mixing represents the first step in tire production. A fundamental understanding of mixing is necessary for optimizing Banbury processes, for assuring batch-to-batch consistency, and for relating mix parameters to material end properties. Despite the importance of kinetic, thermodynamic, and theological principles to the mixing process, the industry has not achieved a suitable methodology that integrates the control of such parameters into a generally applicable, continuous control process Part of the reason is the difficulty in obtaining reliable experimental data that can be directly related to the object principles. For example, approaches in the past have tried to link dispersion kinetics to power consumption or to changes in dispersion quality. The main drawback of the first approach is that power consumption is not solely a function of dispersion it also depends on compound viscosity, temperature and mixer parameters. The main drawback of the second approach is the subjectivity associated with assigning dispersion quality ratings.

Previously proposed attempts to achieve a suitable control system framework have proven less than optimal. U.S. Pat. No. 4,455,091 (Bamberger et al.) correlates temperature of the mixture with energy supplied to the rotors. Such a system, however, ignores the other factors set forth above (viscosity, mixer parameters, etc.) that can affect power consumption. WO 99/24230 (Hanna Rubber Compounding) likewise utilizes a reference curve to correct process temperature by varying rotor speed and suffers, therefore, from the same limitation. EP1201387 A1 divides the process into successive phases during which time a rectilinear approximation is used to determine the values of various process parameters. A temperature or power curve is followed over sequential but arbitrarily defined "mixing phase" intervals by linearizing the curves over each interval. The gradients (slopes) of the linearized segments are used to provide feedback to a controller that manipulates ram pressure or rotor speed to match the actual gradient to the expected gradient for any given mixing phase. Such an approximation does not directly link the cause and effect between the independent variables (mixer operating conditions of rotor speed and ram pressure) and the dependent variables (temperature, torque, energy, power, reaction extent).

Accordingly the need remains for a method for directly computing dispersion extent, batch temperature, and rotor torque in a mixer so as to maximize compound uniformity and performance attributes while minimizing energy consumption. The methodology should permit engineers and compounders to evaluate the efficiency of mixing protocols and to set mixing conditions to achieve optimal results. Such a process would allow for rapid comparison between alternative procedures, compounds or mixers in order to optimize mixing efficiency and minimize energy consumption.

SUMMARY OF THE INVENTION

The present invention provides a method for directly computing and controlling dispersion extent, reaction extent, batch temperature, rotor torque, and instantaneous power in a mixer based on fundamental kinetic, thermodynamic and Theological principles. The method uses a series of steps based on fundamental kinetic, thermodynamic and rheological equations to describe dispersion extent, reaction extent, mean batch temperature, and mean torque or instantaneous power in a mixer as functions of mixing time. The parameters required for solution of the model equations are either known a priori, can be determined empirically, or can be estimated from an appropriate database. Initial mixer conditions, compound characteristics, and necessary parameters are specified by the user and provided as input. The extent of dispersion and reaction (if reactive components are present) are then calculated over a user specified time interval. Once the dispersion and reaction rates are known, the energy balance around the mixer can be solved to give mean batch temperature over the same time interval. Once the temperature is known, mean batch viscosity is calculated based on models for the effect of temperature as well as filler incorporation, dispersion and fragmentation on the batch viscosity over the same time interval. The mean viscosity value is linked to the torque acting on the rotors, or to the power supplied to the rotors over the same time interval. The torque or power calculated pursuant to the method can then be used to obtain mixing energy, work, integrated torque or total power consumption, as desired. The procedure is repeated over subsequent time intervals generating dispersion extent, reaction extent, temperature, and torque or power profiles until a user-specified end-point is reached. The end-point may be time, temperature, dispersion extent, reaction extent, integrated torque, work, energy, power consumption or other process parameters or any combination of same.

The methodology describes the processes that occur in a mixer in order to predict batch properties in real time. The method thus is based on fundamental kinetic, thermodynamic, and rheological principles and directly links cause and effect between the independent mixing variables and the dependent variables. The subject method can be used as a process control and can also be applied to predict compound properties such as dispersion extent, reaction extent and viscosity, optimization of mixing routines for specific compounds. The method may further be useful if desired in troubleshooting off-spec batches, and in performing mix simulations. While of particular utility in conjunction with batch (discontinuous) processes, the method also has utility in continuous mixing procedures and systems.

BRIEF DESCRIPTION OF THE DRAWINGS

The invention will be described by way of example and with reference to the accompanying drawings in which.

DETAILED DESCRIPTION OF THE PREFERRED EMBODIMENTS

As described generally above, it is well known to employ a mixer and mixing process in the formulation of compounds necessary to the manufacture of sundry goods including tires. The mixer may be either continuous or discontinuous. In a continuous process, material is passed through a cylindrical chamber by operation of a screw mechanism. A discontinuous, or "batch" process, mixes the material within an enclosed chamber by operation of one or more mixing rotors. A typical mixer suitable for the discontinuous mixing of compounds consists of a mixing chamber containing a pair of rotors that rotate in opposite directions and thereby process discrete batches of material within the chamber. Commercial mixers are available and are marketed under the "Banbury" or "Intermix" names. A mixer of the general type applicable for use of the subject invention is described in European Patent Application EP 1201387 A1 (Proni) incorporated herein by reference.

Mixing kinetics are of fundamental interest in order to optimize the mixing process for assuring batch-to-batch consistency and for relating mix parameters to material end properties. One purpose of the subject invention is to provide a method of controlling a mixing process so as to assure batch-to-batch consistency, and to permit greater flexibility in defining batch drop criteria by including dispersion extent, reaction extent, or relative viscosity of the batch, as applicable. In this application, the subject invention would be used in conjunction with a mixer control system, for example of the proportional-integral type, well known to those skilled in the art of process control.

A further purpose of the subject invention is to permit engineers and compounders to evaluate the efficiency of mixing protocols using a desk-top computer that has access to the subject algorithm, equations and associated databases. The algorithm allows calculation of important mixing parameters such as batch temperature, torque acting on the rotors, instantaneous power demand, extent of filler dispersion, and extent of reaction as functions of time for user-selected compounds and mixing conditions. In this way, alternative procedures, compounds or mixers can be rapidly compared and evaluated with a computer in order to optimize mixing efficiency.

Figure 1:
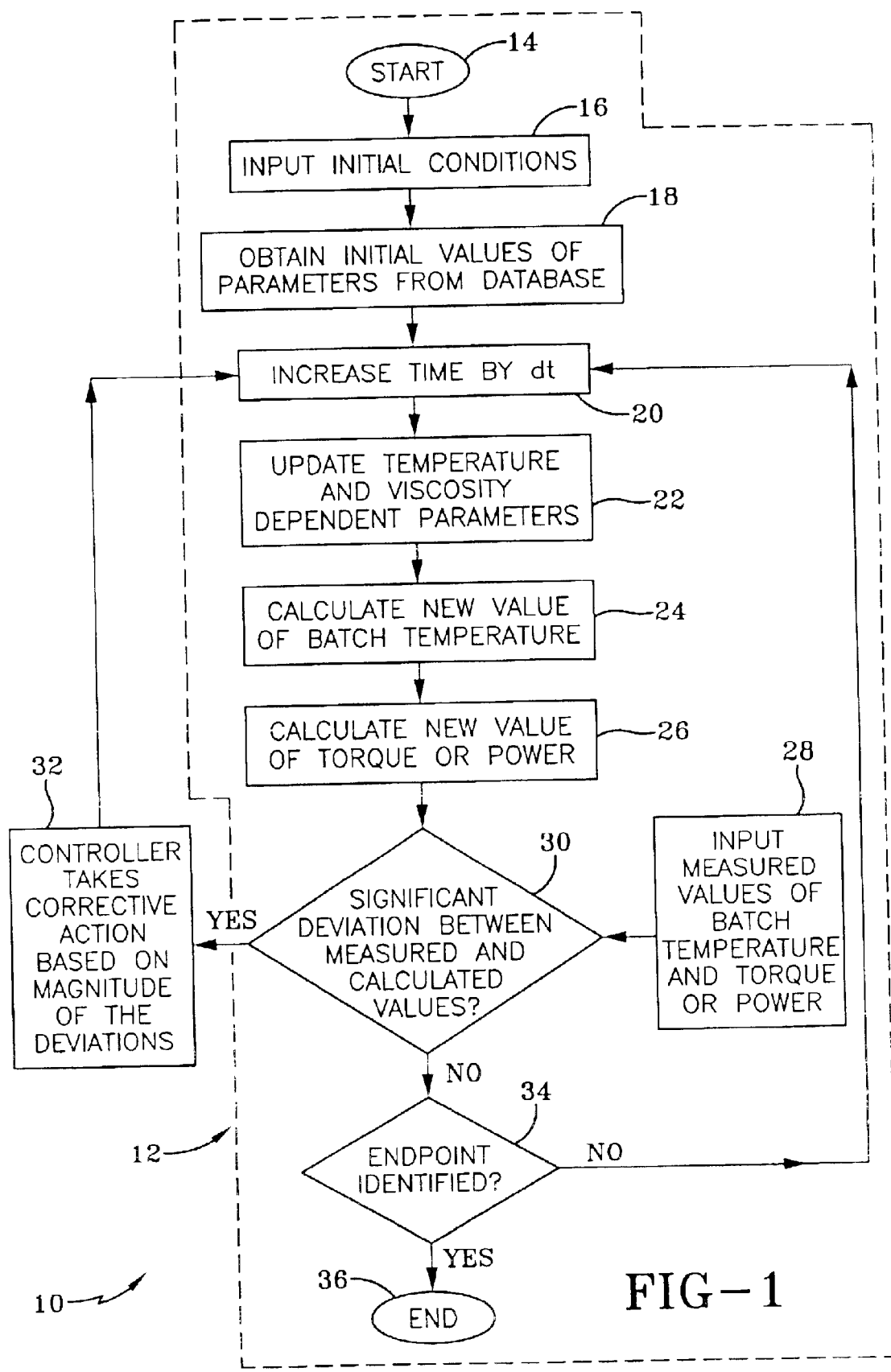
FIG. 1 is a generalized flow diagram of the control method comprising the subject invention.

Referring initially to FIG. 1, the subject mixing model system with mixer control method 10 is shown in block diagram form. The algorithm 12 uses a series of equations based on fundamental kinetic, thermodynamic and rheological models to describe dispersion extent, reaction extent, mean batch temperature, and mean torque or instantaneous power in a mixer (such as a Banbury mixer) as functions of mixing time. The parameters required for solution of the subject equations are either known a priori, can be determined empirically, or can be estimated from an appropriate database as explained below. The algorithm starts 14 with an input of mixer starting conditions 16, and initial values of the model parameters are obtained from a database 18. Time is increased by a preset interval dt 20, and the temperature- and viscosity-dependent parameters are adjusted to reflect the latest values of temperature and viscosity 22. The energy equations are then solved to give the new temperature at the end of time interval dt 24. Once the temperature is known, the mean batch viscosity relative to an initial peak viscosity is calculated over the same time interval dt. This mean viscosity is linked empirically to either the torque acting on the rotors, or to the instantaneous power demand over the same time interval 26. Either calculated value can be used to derive related quantities such as integrated torque, energy or total power consumption.

Actual values of temperature and torque or instantaneous power are measured from the mixer over the same time interval dt 28. These actual values are compared to the calculated values over time interval dt to determine any deviations in temperature and torque/power. If a statistically significant difference is found in one or both quantities 30, the differences are used as input to a controller of proportional integral type, which then manipulates one or more of ram pressure, rotor speed or ram position in a manner designed to reduce the inputted differences 32. The value of the deviations between calculated and measured quantities used for control purposes can be based on either temperature or torque/power curves alone, a weighted average of the two, a maximum value of the two, or any other combination thereof.

After the control action is taken, the time is increased by interval dt again 20 and a new computation cycle occurs as illustrated. The procedure is repeated in this manner over subsequent time intervals until the endpoint is achieved 34, and the control process ends 36. The endpoint can be time, temperature, relative viscosity, dispersion extent, reaction extent, integrated torque, work, energy, total power or other parameters that will be apparent to those in the art. A combination of the foregoing may also be identified with the endpoint if multiple parameters are used to achieve an optimum desired result.

By way of example, the subject algorithm is explained below using a mixture of carbon black filler, silica filler, silane coupling agent incorporated into a rubber matrix consisting of at least one polymer to form a compound that is common to the manufacture of tires. The calculation of dispersion extent, reaction extent, temperature and torque or power represented at steps 24 and 26 of FIG. 1 are discussed below.

The initial values of mixer parameters required to solve the model equations in step 18, may be obtained from a suitable database. Mixer-specific parameters are related to the particular geometry of the mixer to be modeled, as well as the set-up (rotor type, ram pressure, oil addition method, etc.). These parameters can be inferred from typical temperature and torque or power curves and from analyzing actual mixers. Compound-specific parameters are related to the characteristics of the polymers, fillers and other components used in the formulation to be mixed. Other model parameters rely on the interaction of the compound and the mixer, and can be determined from carefully designed experiments. A relational database is thus created from which to draw initial values of the mixer parameters (step 18) in the process.

Calculation of Dispersion Extent and Dispersion Rate

The dispersion kinetics of a filled compound may be calculated as follows. Once the filler has been wetted by the rubber, the dispersion of the filler-rubber agglomerates proceeds according to a first order rate equation leading to an equilibrium distribution of filler-rubber agglomerates. Mathematically, this rate equation is written:

$$r_d = -\frac{dC_A}{dt} = k_d(C_A - C_{A\infty}) \tag{1}$$

In Equation (1), $C_A$ is the concentration of agglomerates larger than a specific size at any given mixing time, $C_{A\infty}$ is the concentration of the same agglomerate fraction after long mixing times. The parameter $k_d$ is the dispersion rate constant. The rate of dispersion of the large agglomerate fraction represented by subscript A is given by $-dC_A/dt$. Agglomerate in this context is understood to mean the filler aggregates and any associated rubber—these are the agglomerates discernible through an optical means of determining dispersion extent (for example, through the use of an apparatus such as the Dispergrader).

Equation 1 is subject to the following conditions.

At mixing time t=0, $C_A=C_{A0}$. Physically, t=0 corresponds to the time when the filler has been sufficiently wetted by the rubber in the mixer, and dispersion begins.

Equation (1) can thus be integrated from time 0 to any subsequent time t to give the general rate equation:

$$\ln\left(\frac{C_A - C_{A0}}{C_{A0} - C_{A\infty}}\right) = -k_d t \tag{2}$$

From Equation (2), the time required to achieve a level of dispersion corresponding to $C_A$ may be calculated.

Calculation of Reaction Extent and Reaction Rate

If reactive components are present in the mixer, then a chemical reaction will occur once a threshold temperature has been attained. A number of possible kinetic equations are available to describe chemical reaction in a mixer. Typically, a first order or second order equation is valid. A first order equation is of the form shown below mathematically.

$$r_{r1} = -\frac{dC_R}{dt} = k_1 C_R \tag{3}$$

In Equation (3), $C_R$ is the concentration of a reactant. The parameter $k_1$ is the first order reaction rate constant. The rate of reaction based on the disappearance of reactant R is given by $-dC_R/dt$.

Equation (3) is subject to the following condition.

At reaction time t=0, $C_R=C_{R0}$ Physically, t=0 corresponds to the time when the temperature threshold for reaction has been attained. Equation (3) can thus be integrated to give:

$$\ln\left(\frac{C_R}{C_{R0}}\right) = -k_1 t \tag{4}$$

If the chemical reaction obeys first order kinetics, the time required to deplete an amount of reactant corresponding to $C_R$ may be calculated from Equation (4).

A second order reaction equation is of the form shown below mathematically.

$$r_{r2} = -\frac{dC_R}{dt} = k_2 C_R^2 \tag{5}$$

In Equation (5), $C_R$ is the concentration of reactant. The parameter $k_2$ is the second order reaction rate constant. The rate of reaction based on the disappearance of reactant R is given by $-dC_R/dt$.

Equation (5) is subject to the following condition.

At reaction time t=0, $C_R=C_{R0}$. Physically, t=0 corresponds to the time when the temperature threshold for reaction has been attained. Equation (5) can thus be integrated to give:

$$\frac{1}{C_R} - \frac{1}{C_{R0}} = k_2 t \tag{6}$$

If the chemical reaction obeys second order kinetics, the time required to deplete an amount of reactant corresponding to $C_R$ may be calculated from Equation (6).

The reaction rate constants $k_1$ and $k_2$ are both functions of temperature. For non-isothermal conditions in a mixer, these constants may be adjusted for changes in temperature by using an Arrhenius-type relationship. Such a relationship is shown below mathematically:

$$k_{T_2} = k_{T_1} \beta^{T_2 - T_1} \tag{7}$$

In Equation (7), $T_1$ and $T_2$ refer to the different temperatures in the mixer at different reaction times. Subscripts $T_1$ and $T_2$ refer to the corresponding value of the rate constants (either first or second order). $\beta$ is an empirically determined constant whose value is normally close to 1.05.

Temperature Calculation from an Energy Balance

Figure 2:
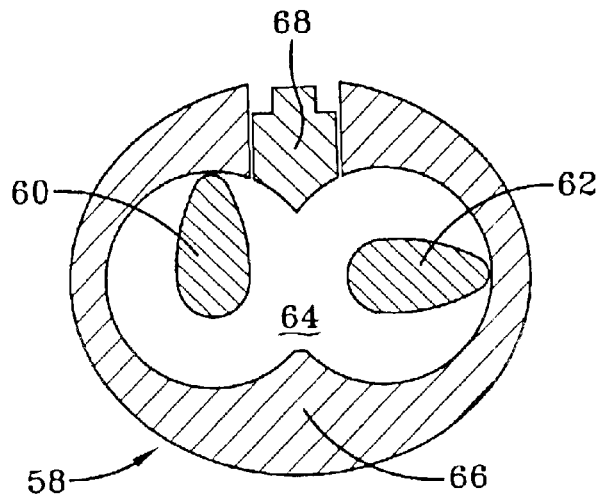
FIG. 2 is a diagram of the mixing chamber of an internal mixer illustrating the components that affect the mixing process.

With reference to FIG. 2, a schematic representation of a mixer 58 is depicted to demonstrate thermal transfers. The mixer 58 includes a pair of rotors 60, 62 housed within a cavity 64. Mixer walls 66 enclose the cavity 64 and a compression plunger 68 pressures batch material housed within the cavity 64. It will be appreciated that thermal transfers during mixing can be determined from an energy balance around the mixer 58. The change in energy of the batch within the cavity 64 during mixing is the sum of the energy exchange with the walls 66 and rotors 60, 62, and the energy imparted into the batch due to the motion of the rotors 60,62. The energy imparted by the rotors is dissipated in dispersing fillers into the rubber within cavity 64, in carrying out any chemical reactions among reactive components within cavity 64, and in masticating the batch. Mathematically, the expression is:

$$mC_p \frac{dT}{dt} = \quad (8)$$

$$UA_h(T_w - T) + \Delta H_d V r_d + \Delta H_r V r_r + VN \sum_{i=1}^{n} F_i \Delta H_{mi} e^{\frac{-A(T-T_{refi})}{B+T-T_{refi}}}$$

In Equation (8), the first term on the left hand side LHS of the equation represents the change in energy during mixing, the first term on the right hand side RHS represents energy exchange with the wall 66 and rotors 60, 62, the second RHS term represents the energy required to disperse the filler, the third term on the RHS represents the energy required for any chemical reaction, and the last RHS term represents the energy required to masticate each different polymer, i, out of n total polymers present in the cavity. In the LHS term, m is the total mass of the material in the cavity 64, $C_p$ is the heat capacity of the batch, T is the batch temperature, and t is time. In the first RHS term, U is the overall heat transfer coefficient of the batch, $A_h$ is the total area of the cavity and rotors available for heat transfer, and T, is the mean temperature of the inner surface of the wall 66, and the outer surface of the rotors 60,62. In the second RHS term, $\Delta H_d$ is the heat of dispersion, V is the volume of the batch within cavity 64, and $r_d$ is the dispersion rate equation given, for example, by Equation (1). In the second RHS term $\Delta H_r$ is the heat of reaction and $r_r$ is the reaction rate equation given, for example by Equation (3) for a first-order reaction, or Equation (5) for a second order reaction. In the third RHS term N is the speed at which the rotors turn, $F_1$ is the volume fraction of each polymer i relative to all polymers n, $\Delta H_{mi}$ is the heat of mastication for polymer i, A and B are constants and $T_{refi}$ is a suitable reference temperature characteristic of polymer i, for example, the glass transition temperature.

In Equation (8) it is possible that one or more of the RHS terms may be zero. For example, if there are no reactive components present, then the third RHS term becomes zero. Similarly, if there are no fillers present, then the second RHS term becomes zero. For the case where one polymer is being masticated in the mixer with no fillers or reactive components present, only the first RHS and fourth RHS terms would have non-zero values.

Figure 3:
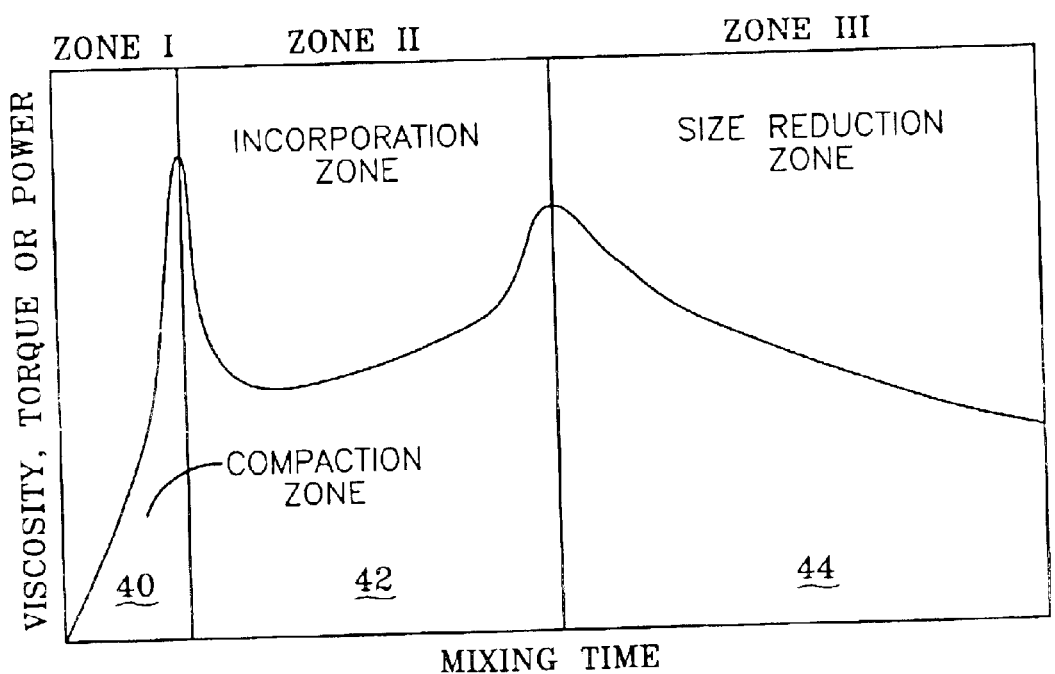
FIG. 3 is a graph of a typical viscosity torque or instantaneous power curve zoned for the purpose of illustration.

Equation (8) is a differential equation that may be solved by any number of numerical solution techniques, such as a fourth-order Runge-Kutta technique, known to those skilled in the art. Torque and Power Calculation from Viscosity Models A rigorous calculation of the torque acting on the rotors 60,62 during mixing requires solution of the appropriate momentum and continuity equations to determine material velocity and stress distributions. For systems of practical importance to industries such as tire manufacturing, such an approach is problematic given that unknown boundary conditions exist, the systems are multiphase and non-homogeneous, and there is no readily applicable constitutive model to describe the relationship between stress and strain throughout the entire mix cycle. Thus, a strictly fundamental approach to determine torque or power requirements is difficult. Therefore, the present invention simplifies the calculation by considering the instantaneous torque acting on the rotors or the instantaneous power demand during mixing to be directly proportional to the batch viscosity at any mixing time. The viscosity of the batch during mixing is depicted in FIG. 3, comprising three zones. In the first zone (40), identified herein as the "compaction zone", air in the cavity is displaced by the polymer, filler and other additives through the action of the rotors and the lowering of the ram. Viscosity is a maximum when all materials have been charged into the chamber and compressed therein. This maximum in viscosity corresponds to a first peak in torque or power. The behavior of materials in Zone 1 is a strong function of many variables including chamber geometry, rotor geometry and motion, ram motion, initial chamber temperature, and size and characteristics of the feed materials.

In the second zone (42), referred to as the "incorporation zone", the batch viscosity is determined principally by two competing mechanisms: temperature increase and filler incorporation. Temperature increases rapidly due to viscous dissipation of energy by the polymer, which tends to lower batch viscosity. However, as the polymer flows and coats the filler, thereby incorporating the filler, batch viscosity tends to increase. The interplay of these two mechanisms results in the characteristic minimum noted in FIG. 3 for this zone. The second zone (42) ends when the filler has been completely incorporated, a state often associated with a second peak in viscosity, torque or power as illustrated.

Viscosity in the second zone may be calculated by formulating equations that describe both mechanisms:

$$\left\{ \begin{array}{c} \text{Zone II} \\ \text{Viscosity} \end{array} \right\} = \left\{ \begin{array}{c} \text{Temperature Effect} \\ \text{on Viscosity} \end{array} \right\} + \left\{ \begin{array}{c} \text{Filler Effect} \\ \text{on Viscosity} \end{array} \right\}$$

The temperature effect may be modeled with a Williams-Landel-Ferry equation of the form shown below.

$$\eta = \eta_{ref} e^{\frac{-A(T-T_{ref})}{B+T-T_{ref}}} \quad (9)$$

In Equation (9) 9 is the viscosity at temperature T, $\eta_{ref}$ is the viscosity at a suitable reference temperature $T_{ref}$, and A and B are constants.

The filler effect on viscosity may be modeled with a number of equations such as a modified Einstein equation of the form shown below.

$$\eta = \eta_o(1 + 2.5\phi_{eff} + A\phi_{eff}^2) \quad (10)$$

In Equation (10) $\eta_o$ is the unfilled viscosity, $\phi_{eff}$ is the effective filler concentration, and A is a suitable constant. The effective concentration is the concentration of filler particles plus polymer that is strongly associated with the particles. The nature of the association may be mechanical (forced into filler pores during mixing), chemical (bonding), or physical (adsorbed). The filler-associated polymer acts as part of the filler particle during deformation in the mixer, and is hence considered part of the filler volume fraction in Equation (10). $\phi_{eff}$ is a function of mixing time.

An equation of the type first proposed by Roscoe is also suitable for modeling the filler effect on batch viscosity. This type of equation is shown below.

$$\eta = \eta_o(1 - A\phi_{eff}) \quad (11)$$

In Equation (11) $\eta_o$ and $\phi_{eff}$ are as defined in Equation (10) while A and B are suitable constants.

The calculation of $\phi_{eff}$ in Equations (10) and (11) can be assumed to be controlled by the transfer of polymer in the bulk phase to a state associated with the surface of the filler particle. Such mass-transfer-controlled kinetics can be described mathematically as follows.

$$\phi_{eff} = \phi_{filler} + \phi_{assoc} \quad (12)$$

$$\phi_{assoc} = 1/2\phi_R - 1/2(\phi_R - 2\phi_o)(e^{-k_m T}) \quad (13)$$

In Equation (12), $\phi_{filler}$ is the volume fraction of filler particles, $\phi_{assoc}$ is the volume fraction of filler-associated polymer, defined in Equation (13). In Equation (13) $\phi_R$ is the volume fraction of rubber in the batch, $\phi_o$ is the volume fraction of polymer initially associated with the filler, km is the mass transfer coefficient and a is the surface area of the filler particles.

Equations (9) through (13) together describe the viscosity profile in the second zone of a typical mixing cycle. Since the measured variable during mixing is usually either torque or power, these equations can be rewritten to calculate either dimensionless torque or dimensionless power Equation (14) below shows a method of calculating dimensionless torque or power in the second mixing zone based on Equation (9) and Equation (11) where the reference temperature is the glass transition temperature of the polymer.

$$\frac{M_2}{M_{1PEAK}} = \frac{P_2}{P_{1PEAK}} = K'_1 e^{\frac{-1744(T-T_g)}{516+T-T_g}} + K_1(1 - 1.35\phi_{eff})^{-2.5} \quad (14)$$

In Equation (14), $M_2$ is the value of torque at any time in the second zone, $M_{1PEAK}$, is the peak value of the torque in the first zone, $P_2$ is the value of instantaneous power at any time in the second zone, $P_{1PEAK}$, is the peak value of instantaneous power in the first zone, $K_1$ and $K'_1$ are proportionality constants that relate viscosity to the measured variable, torque or power. The remaining parameters have been defined elsewhere.

Equation (14) in combination with Equations (12) and (13) allows calculation of torque or power in the second mixing zone once the model parameters have been determined.

In the third zone (44), referred to as the "size reduction zone", the viscosity of the batch with incorporated filler decreases steadily with mixing time as filler agglomerates and particles are broken up under the shearing action of the rotors. This mechanism leads to a decrease in the torque acting on the rotors, as well as to a decrease in the power demand of the mixer. If a chemical reaction is occurring that involves the creation of chemical bonds with polymer molecules, batch viscosity may tend to increase with reaction extent. Finally, if the polymer is susceptible to thermal degradation reactions in the third zone, batch viscosity may tend to decrease with degradation extent.

There are a number of equations that are suitable for describing size reduction of filler particles in the third zone by mechanisms such as erosion, rupture or combinations of the two. A suitable equation based on a mechanism of particle erosion has been recently proposed by Manas-Zloczower et al. This model describes the formation of fragments from parent particles during mixing under shearing forces.

$$\eta = \eta_o(1 + 2\phi_f + 6.2\phi_f^2)(1 + 2.5\phi_p + 6.2\phi_p^2) \quad (15)$$

In Equation (15) $\eta_o$ is the original batch viscosity, $\phi_f$ is the volume fraction of fragments and $\phi_p$ is the volume fraction of parent agglomerates. The latter two quantities are functions of mixing time, and can be calculated with a suitable rate equation. A pseudo-first order rate equation such as Equation (2) is acceptable in many cases to calculate both $\phi_f$ and $\phi_p$ as functions of mixing time, yielding rate constants $k_f$ and $k_p$.

$$\phi_f = (\phi_{f0} - \phi_{f\infty})(e^{k_f t}) + \phi_{f\infty} \quad (16)$$

$$\phi_p = (\phi_{p0} - \phi_{p\infty})(e^{-k_p t}) + \phi_{p\infty} \quad (17)$$

Equation (15) can be put in a form similar to Equation (14) to calculate torque or instantaneous power in the third zone if degradation and chemical reaction effects on batch viscosity can be ignored. The result is shown below.

$$\frac{M_3}{M_{1PEAK}} = \frac{P_3}{P_{1PEAK}} = K_2(1 + 2.5\phi_f + 6.2\phi_f^2)(1 + 2.5\phi_p + 6.2\phi_p^2) \quad (18)$$

In Equation (18), $M_3$ is the value of torque at any time in the third zone, $P_3$ is the value of instantaneous power at any time in the third zone, and $K_2$ is a proportionality constant that relates batch viscosity to the measured variable, torque or power. The remaining parameters have been defined elsewhere.

Equation (18) in combination with suitable kinetic equations for $\phi_f$ and $\phi_p$, such as Equations (16) and (17), allows calculation of torque or power in the third mixing zone once the model parameters have been determined.

For blends of miscible polymers, Equations (9) through (18) can be applied to each polymer in the mixer independently. The batch viscosity can then be obtained from an equation based on the logarithmic rule of mixtures of the type as, for example, recently proposed by Couchman for a binary polymer mixture.

$$\ln\eta = F_1^2 \ln \eta_{11} + F_2^2 \ln \eta_{22} + 2F_1 F_2 (\ln \eta_{22}) \quad (19)$$

In Equation (19) $\eta$ is the batch viscosity, $\eta_{11}$ and $\eta_{22}$ are the pure component viscosities, and $\eta_{12}$ is a viscosity correction term It must be noted that not all batches will exhibit the three mixing zones outlined herein. There are a number of important exceptions. For the simple mastication of an unfilled rubber, for example, only two mixing zones will be apparent. The first mixing zone would correspond to compaction, but the second mixing zone would show a monotonic decrease in viscosity, torque and power. In this case, the second mixing zone will be described by Equation (9), which calculates the effect of temperature on batch viscosity.

In other cases, one of the mixing zones could be of extremely short duration. Such a situation could be expected, for example, during a remill where a batch containing the filler largely incorporated in a preceding pass is mixed in an internal mixer once again with no further addition of filler. In such a case, the mixing cycle would be dominated by the third mixing zone and Equation (18).

There are also situations where the third mixing zone may be absent or of extremely short duration. In a first non-productive pass with high loadings of filler being present, temperature build-up may be such that the batch must be removed from the mixer shortly after the incorporation peak at the end of the second mixing zone is achieved. In such cases, the mixing cycle would be dominated by the second mixing zone and Equation (14).

Algorithm for Use of the Mixing Models

Figure 4:
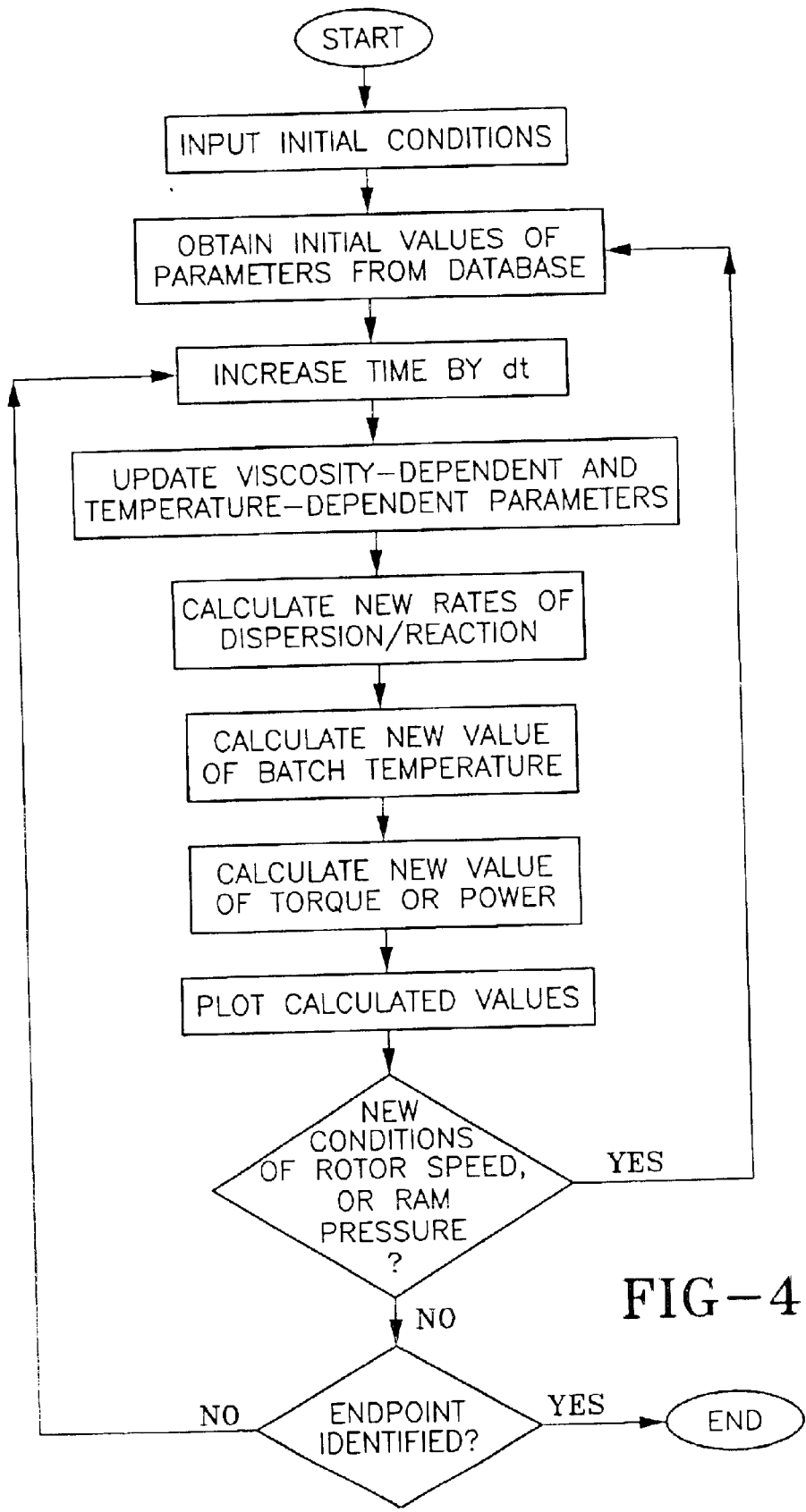
FIG. 4 is a flow diagram of the subject process illustrating the sequence of steps in graphic form.

FIG. 4 graphically illustrates the method for using the mixing equations described above in a computer algorithm for modeling dispersion extent, reaction extent, temperature viscosity, torque or power during the mixing of a compound in an internal mixer. Initial conditions of mixer temperature, rotor speed, and component masses charged into the mixer are first determined. The fixed parameters are obtained from a database that tabulates the values of compound-specific parameters such as $C_{R0}$, $C_{A0}$, $C_p$, $T_{ref}$, $\Phi_R$, $\Phi_{p0}$, $\Phi_{f0}$, $\Phi_o$, $\Phi_{filler}$, a, $F_1$, $\beta$ from Equation (7), A and B from Equation (9), A from Equation (10), A and B from Equation (11); as well as mixer-specific parameters such as $A_h$ and V. A second set of parameters independent of mixing time, but functions of both compound and mixer characteristics include $C_{A\infty}$, $\Phi_{f\infty}$, $\Phi_{p\infty}$, $K_1$, $K'_1$ and $K_2$.

These parameters can be obtained empirically from selected experiments obvious to persons skilled in the art. The last set of parameters has values that depend on either batch temperature or batch viscosity, and must thus be recalculated at regular intervals during a mix cycle. These parameters include U, $\Delta H_r$, $\Delta H_d$, $\Delta H_{mi}$, and all of the rate constants. At time 0, initial values of all of these parameters are required, and can be obtained from selected experiments obvious to persons skilled in the art.

Once initial conditions and initial values of parameters have been obtained, mixing time is increased by a step value corresponding to dt. The temperature and viscosity-dependent parameters are recalculated using the latest values of temperature and torque or power. Rates of dispersion and reaction are subsequently calculated.

These results are used to solve the energy equation to calculate batch temperature. The new batch temperature is used as input to solve the viscosity equations and a new value of torque or power is calculated. At this point, the algorithm may report the updated values of dispersion extent, reaction extent, temperature, relative viscosity, torque, instantaneous power, as well as associated values such as integrated torque or total power consumption. The algorithm then checks to determine whether new conditions exist at the updated values of time, temperature, torque, power, or any related value. For example, a ram raise may occur at a preset time, or rotor speed may be changed at a preset temperature. If such a change in mixing conditions is detected, new initial values of model parameters are obtained for the new conditions and a new computation cycle occurs at the changed conditions. If no such change in mixing conditions is detected, the algorithm determines whether any endpoint criteria have been met. These criteria can include any quantity calculated by the algorithm, as well as combinations of the same. For example, a target temperature could be specified within a preset time window. Reaction extent, dispersion extent, dimensionless viscosity, as well as integrated torque or total power could all be used separately or in combination as a drop criterion or criteria. If no endpoint is identified by the algorithm, a new computation cycle occurs, as illustrated.

One embodiment of the subject invention is discussed below for a compound consisting of natural rubber with 40 parts per hundred based on the rubber of carbon black meeting the specifications of ASTM class N121. This is a typical grade used in compounds for tire tread applications. The mixer was a Kobe BB2 laboratory mixer, and the model parameters are summarized in Table 1, below.

TABLE 1

| Parameter | Units | Value |
| --- | --- | --- |
| $K_1'$ | — | 230000 |
| $k_f$ | $s^{-1}$ | 0.150 |
| $\Phi_{f0}$ | — | 0 |
| $\Phi_{f\infty}$ | — | 0.0020 |

TABLE 1-continued

| Parameter | Units | Value |
| --- | --- | --- |
| $K_1$ | — | 0.07 |
| $k_m a$ | $s^{-1}$ | 0.0175 |
| $k_p$ | $s^{-1}$ | 0.0300 |
| $\Phi_R$ | — | 0.8340 |
| $\Phi_o$ | — | 0 |
| $\Phi_{po}$ | — | 0.1660 |
| $\Phi_{p\infty}$ | — | 0.0010 |
| $K_2$ | — | 0.42 |
| $T_g$ | °C. | −70 |
| $U_0$ | W/m²K | 20 |
| N | $s^{-1}$ | 1.17 |
| $A_h$ | m² | 0.20 |
| m | g | 1050 |
| $C_p$ | J/g °C. | 1.8 |
| $T_{wSP}$ | °C. | 60 |
| $\Delta H_{d0}$ | J/m³ | $2.5 \times 10^6$ |
| V | m³ | 0.000978 |
| $k_D$ | $s^{-1}$ | 0.012 |
| $C_{A\infty}$ | % | 1.0 |
| $\Delta H_{r0}$ | J/m³ | $1.5 \times 10^{12}$ |

Figure 5:
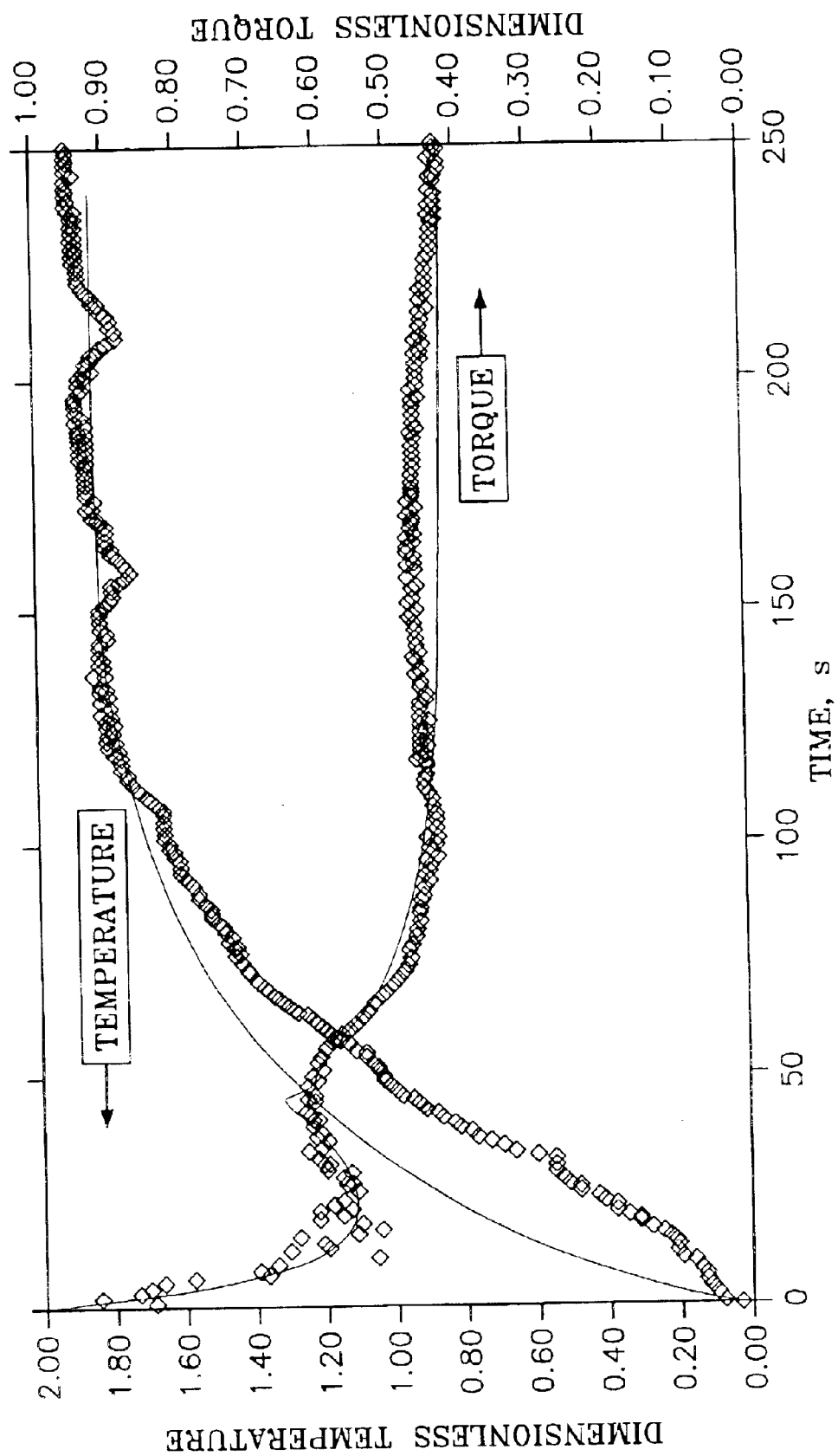
FIG. 5 is a graph of dimensionless temperature and torque comparing the values obtained from an actual mixer to values calculated from the algorithm for 40 phr carbon black in natural rubber.

These parameters are used in Equations 8, 14 and 16 to calculate temperature and torque profiles in mixing zones 2 and 3. In FIG. 5, the model results are compared to the measured data from the mixer. Temperature is normalized with respect to the initial mixer temperature $T_{wSP}$. Torque is normalized with respect to the peak torque measured in mixing zone 1. The smooth curves are the model predictions and the data points are the measured values from the mixer.

The subject invention and its associated algorithms may be readily programmed into a computer as will be appreciated by those skilled in the art. While preferred equations are disclosed above suitable to enable one skilled in the art to practice the inventive method, the invention is not intended to be so limited. Other valid equations may be substituted if desired into the algorithms.

From the above description of the preferred embodiment, it will be understood that the subject invention represents a method and system for controlling a mixing process that directly solves the cause-effect link between the independent variables (mixer operating conditions of rotor speed, ram movement and pressure) and the dependent variables (batch temperature, torque, energy, power, dispersion extent, reaction extent). The invention links such independent mixing variables and the dependent variables through the application of scientifically recognized kinetic, thermodynamic, and Theological equations. As such, the invention provides a mathematical description of the fundamental non-linear processes that underlie mixing physics in a mixer. The nonlinear governing equations are valid throughout the mixing cycle and can be used to regulate said cycle at any point in the mix cycle.

The applications for the invention include, but are not limited to, the study of the effect of mixing variables and recipe components on batch temperature, dispersion, chemical reaction, and torque/power consumption. The methodology may also be useful in optimizing mixing protocols for component addition sequence, rotor speed, mixer temperature and mixing time. A further application is to provide real-time calculation of relative viscosity, dispersion extent and reaction extent, as well as the calculation of values of temperature and torque or power as part of a control system.

Variations in the present invention are possible in light of the description of it provided herein. While certain representative embodiments and details have been shown for the purpose of illustrating the subject invention, it will be apparent to those skilled in the art that various changes and modifications can be made therein without departing from the scope of the subject invention It is, therefore, to be understood that changes can be made in the particular embodiments described which will be within the full intended scope of the invention as defined by the following appended claims.

What is claimed is:

1. A method for analyzing the mixing of a composition comprising one or more miscible polymeric material(s) and at least one additive material (also applies to mastication of a polymer alone) contained as a batch within a mixing chamber and subjected to an applied mixing force from at least one variable speed mixing rotor, the method comprising the steps:

(a) inputting starting conditions;

(b) obtaining initial values for a plurality of viscosity and/or temperature dependent parameters;

(c) increasing batch mixing time by a first differential mixing time interval;

(d) recalculating values for the plurality of viscosity and/or temperature dependent parameters;

(e) using said viscosity and/or temperature dependent parameters to solve a set of thermodynamic, kinetic and rheological equations in order to obtain values for a plurality of time-dependent variables over said first differential mixing time interval;

(f) determining whether at least one user-specified endpoint of said time-dependent variables or associated quantities has been identified;

(g) increasing mixing time by a second differential mixing time interval to adjust the viscosity and/or temperature dependent parameter values in the event that the endpoint of at least one of the time-dependent variables has not been reached.

2. The method of claim 1, wherein the plurality of time-dependent variables are selected from the group including additive dispersion extent, batch temperature, reaction extent, batch viscosity, power and mixing rotor torque.

3. The method of claim 2 wherein the reaction extent is calculated from a kinetic model over a user-specified time interval.

4. The method of claim 2 wherein the extent of dispersion is calculated from a kinetic model over a user-specified time interval.

5. The method of claim 4 wherein the energy balance of the batch is solved to determine the mean batch temperature over said user-specified time interval.

6. The method of claim 5 wherein calculating mean batch viscosity over the time interval comprises modeling at least one of filler effect, temperature effect, and additive material particle fragmentation effect on batch viscosity.

7. The method of claim 6 wherein further comprising calculating mean viscosity over the user-specified time interval.

8. The method of claim 6 wherein further comprising using the mean viscosity over the user specified time interval to calculate the torque acting on the mixer rotor over said time interval, or the power consumption over said time interval.

9. The method of claim 8 wherein further comprising using the calculated torque acting on the mixer rotor to obtain a value for at least one time-dependent variable having a user-specified end point.

10. The method of claim 9, wherein further comprising:

repeating steps (b–f), over subsequent time intervals; and generating a profile of the at least one user-specified time-dependent variable until the user-specified end point is reached.

11. The method of claim 1, wherein the endpoints of each time-dependent variable lies within respective ranges of values.

12. The method of claim 1, wherein further comprising inputting new starting conditions and repeating steps (b) through (e).

13. The method of claim 1, wherein further comprising:

adjusting independent variables of rotor speed, ram pressure or ram movement in order to optimize one or more time-dependent variables or associated quantities.

14. The method of claim 1, wherein the calculated values of at least one of the time-dependent variables is used to control the mixing of the batch by altering at least one independent variable to minimize the difference between said calculated time-dependent variable(s) and measured value(s) of the same mixer variable(s) over the same time intervals.

15. The method of claim 1, wherein further comprising:

calculating a mixer rotor torque determination and from the mixer torque determination at least one property value selected from the property group consisting of mixing energy, work, or power.

16. The method of claim 1, wherein further comprising;

generating dispersion, temperature and torque profiles through the repetition of steps (b) through (e) over subsequent time intervals until a user-specified end point for at least one time-dependent variable is reached.

17. The method of claim 16, wherein the user-specified end point is a value for a time-dependent parameter from the group consisting of time, temperature, dispersion extent, torque, work, reaction extent, power, or energy.

18. The method of claim 17 wherein the method obtains substantially instantaneous values of the time-dependent parameters at substantially any mix time.

* * * * *